United States Patent [19]

Albert et al.

[11] 4,219,853
[45] Aug. 26, 1980

[54] READ/WRITE THIN FILM HEAD

[75] Inventors: Paul A. Albert; Thomas N. Kennedy, both of San Jose, Calif.

[73] Assignee: International Business Machines Corporation, Armonk, N.Y.

[21] Appl. No.: 972,101

[22] Filed: Dec. 21, 1978

[51] Int. Cl.$^2$ .......................... G11B 5/12; G11B 5/22; G11B 5/42; G11B 5/60
[52] U.S. Cl. .................................... 360/103; 29/603; 360/121; 360/122; 360/125
[58] Field of Search ............... 360/103, 121, 122, 119, 360/120, 123, 124, 125, 124; 29/603

[56] References Cited

U.S. PATENT DOCUMENTS

| Re. 29,326 | 7/1977 | Lazzari et al. | 360/119 |
|---|---|---|---|
| 3,414,971 | 12/1968 | Boehme | 29/603 |
| 3,846,841 | 11/1974 | Lazarri et al. | 360/121 |
| 3,855,625 | 12/1974 | Garnier et al. | 360/103 |
| 3,908,194 | 9/1975 | Romankiw | 360/125 |
| 4,001,890 | 1/1977 | Kayser | 360/121 |
| 4,130,847 | 12/1978 | Head et al. | 360/121 |

OTHER PUBLICATIONS

IBM Tech. Disc. Bull., W. A. Wawick, Multilayer Ceramic Slider For Thin-Film Heads, vol. 15, No. 7, Dec. 1972, pp. 2183-2184.
IBM Tech. Disc. Bull., E. P. Valstyn, Composite Read/Write Recording Head, vol. 14, No. 4, Sep. 1971, pp. 1283-1284.
IBM Tech. Disc. Bull., P. F. J. Landler, Alignment of Read/Write Heads in Sliders, vol. 11, No. 12, May 1969, pp. 1792-1793.

Primary Examiner—Alfred H. Eddleman
Attorney, Agent, or Firm—Kallman, Nathan N.

[57] ABSTRACT

A method of making a thin film inductive head assembly, which has separate read and write transducers, comprises the steps of depositing the elemental layers of one thin film transducer on a substrate; sputter depositing on the transducer a thick transparent insulating layer; flat lapping the thick insulating layer; depositing the elemental layers of a second thin film transducer on the flat lapped insulating layer; and depositing a thick insulating overcoat on the second thin film transducer. The substrate is then configured as a slider element for flying in transducing relation over a record medium, such as a rotary magnetic disk. The resultant structure includes thin film read and write transducers with a thick transparent insulating layer therebetween, all deposited successively in layers on one surface of the substrate, and having a protective insulating overcoat.

12 Claims, 2 Drawing Figures

READ/WRITE THIN FILM HEAD

DESCRIPTION

1. Technical Field

This invention relates to a method of making, and the assembly of, an improved thin film inductive head having both write and read transducers.

An object of this invention is to provide an improved method for producing a thin film inductive head assembly with write and read transducers.

Another object of this invention is to provide an integral thin film head assembly having write and read transducers with effective separation and minimization of electromagnetic interference between the transducers.

Another object is to provide a method for proper alignment of write and read transducers in an integral thin film head assembly.

2. Background Art

In present day data processing technology, the demand for higher data recording densities dictates very narrow transducing gaps in the sensing elements, close flying heights of the sensing elements, such as magnetic heads, relative to the record media, and thin magnetic record layers. To this end, thin film inductive heads have been proposed in lieu of the laminated or ferrite core types which inherently require larger transducing gaps.

In prior art magnetic recording apparatus, dual function magnetic heads having both read and write transducers have been employed. The dual function heads have been generally made from laminated assemblies or ferrite materials. With heads of these types, inherent limitations do not allow the manufacture of heads having transducing gaps of very small length, such as is possible with thin films.

An integral thin film head assembly with dual function transducers would be highly desirable. However, when producing thin film structures with both read and write transducers, problems of electromagnetic interference and alignment of the read and write transducers are experienced. The read and write transducers must be separated sufficiently to negate interference, yet the centerlines and reference throat height lines of the transducers must be properly aligned to tolerances as small as 1.0 micrometers. It is apparent that serious fabrication problems and severe limitations in manufacture would be encountered. For example, if the read and write transducers are processed as separate units and then bonded, by epoxy for example, the problems of alignment and adhesion, among other problems, would be severe.

SUMMARY OF THE INVENTION

An assembly of an integral thin film inductive head includes read and write transducers formed on the same substrate, but having effective separation and precise alignment. The substrate is formed in a configuration of a taper-flat air bearing slider.

BRIEF DESCRIPTION OF THE DRAWINGS

The invention will be described in greater detail with reference to the drawings in which.

It should be understood that the relative dimensions of the various layers of the structure illustrated in the FIGURES are not necessarily accurate, but are illustrated for purpose of conveniences.

DISCLOSURE OF THE INVENTION

Figure 1:
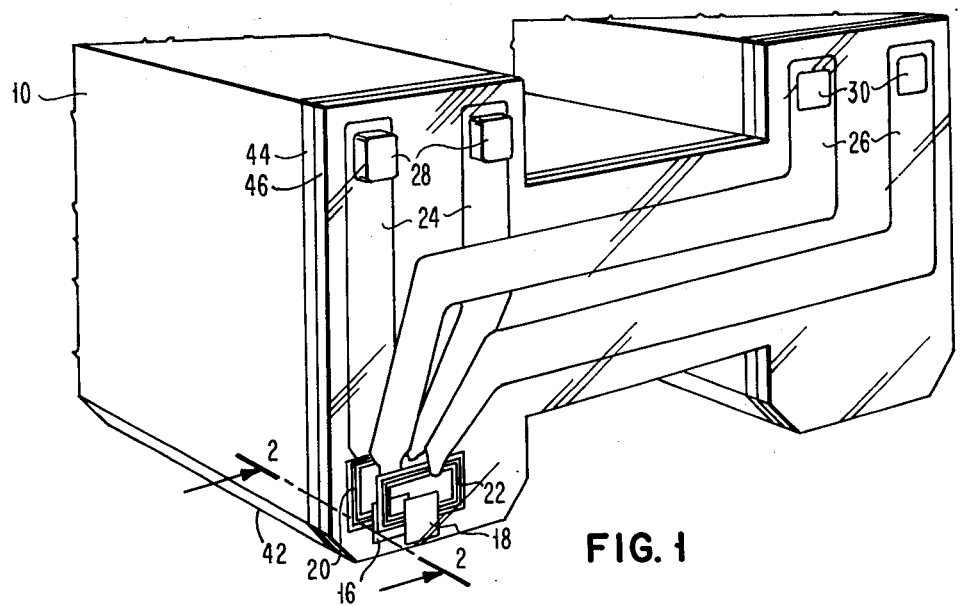
FIG. 1 is a perspective top view of an air bearing head slider assembly, supporting read and write transducers, according to this invention.

With reference to FIG. 1, an air bearing head slider comprises a nonmagnetic ceramic substrate 10 on which a series of thin film layers are deposited to form a read transducer 16, a write transducer 18, and respectively their associated electrical coils 20 and 22, paired conductors 24 and 26 leading from the coils to paired electrical contact studs 28 and 30. The studs serve to connect to the read-write circuitry which is coupled to the read-write channel. A thick separator insulator layer 44 is formed between the read and write transducers. A thick overcoat insulator layer is deposited over the whole assembly.

Figure 2:
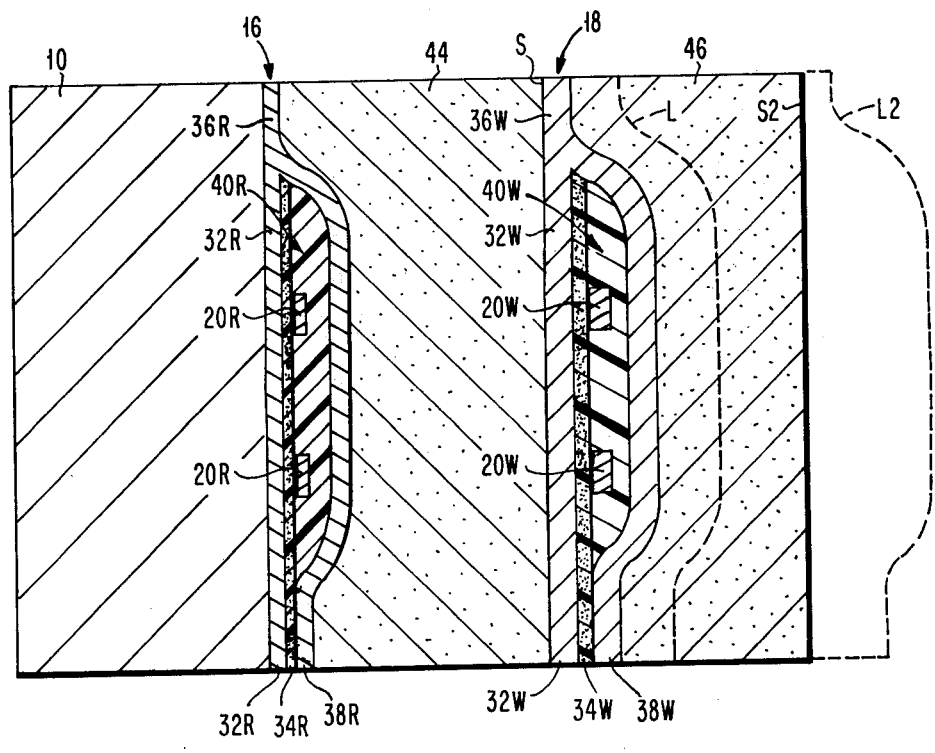
FIG. 2 is an enlarged sectional side view of a thin film read and write transducer assembly, taken through lines 2—2 of FIG. 1.

The process for manufacturing the thin film read and write transducer assembly, as depicted in FIG. 2, comprises the following steps:

1. The nonmagnetic ceramic substrate 10 is prepared by polishing the surface of the substrate to less than twenty-five nanometers, peak to valley surface finish. The substrate support is cleaned and prepared for the deposition of a first layer of Permalloy 32R.

2. Prior to plating the first Permalloy layer 32R, the ceramic substrate structure is made conductive to accommodate the plating material. The conductive layer is formed by metallizing the substrate with a thin Permalloy film, in the range of 50 to 100 nanometers, which may be deposited by either vacuum evaporation or sputtering. The Permalloy layer 32R is then plated onto the conductive surface to a thickness of 1 to 3 micrometers through a photoresist mask, having a predetermined pattern.

After plating the magnetic Permalloy layer 32R, which will provide a first pole piece for the read transducer, the thin metallized conductive Permalloy film is removed by sputter etching of the entire surface.

3. At this point a thin nonmagnetic layer 34R, which will serve as the transducing gap for the read transducer, is deposited onto the surface of the Permalloy layer 32R, by sputtering $Al_2O_3$ to a thickness as desired to define the length of the transducing gap.

4. Using a 50% phosphoric acid solution, the $Al_2O_3$ is then etched off from the back gap closure area 36R of the Permalloy layer 32R. The back gap closure is defined as the area at which the two Permalloy layers 32R and 38R are in contact to close the magnetic circuit.

5. The Permalloy layer 32R is then covered with photoresist, which is patterned to form a pad of photoresist insulation 40R where the Permalloy is to be subsequently crossed by the copper coil. The photoresist is baked in a vacuum oven.

6. The copper coil structure 20 and conductive leads 24 are electroplated over the insulators 34R and 40R, after a conductive film of copper has been deposited by metallization using vacuum evaporation or sputtering. The copper film, having a thickness in the range of 50–100 nm, adheres to a thin film of chromium, of about 5 nm, which has been first deposited. The copper coil structure 20, of about 2 to 4 μm thick, is plated through a photoresist mask onto the conductive copper film. After plating the relatively thick copper coil structure 20, the thin film of copper with chromium undercoat is removed in unwanted areas by sputter etching the entire surface.

7. A photoresist mask patterned to provide a leveling pad of insulation in the region where the copper coil structure will be crossed by the subsequent second Permalloy layer is formed and baked in a vacuum oven.

8. The second Permalloy layer 38R is then plated over the insulation layer, in the same manner as set forth in step 2 above. This second Permalloy layer 38R which makes contact with the first Permalloy layer 32R in the back gap area completes the yoke structure necessary for realizing a closed magnetic circuit with a nonmagnetic transducing gap.

9. Electrical contacts 28 are formed on the insulator 40R by plating through a photoresist mask, in a manner similar to step 6. The electrical contacts 28 are formed as copper studs of about 25 to 50 μm thickness, and are connected by the conductive leads 24 to the coil structure 20R.

At this point, a completed read transducer with a narrow transducing gap 34R has been formed on the substrate 10. The gap is located at the air bearing surface 42 of the head slider that flies over a rotating magnetic disk during read and write operations.

10. In keeping with this invention, a thick insulator separation layer 44 of Al$_2$O$_3$ is sputter deposited over the thin film read transducer assembly. Prior to the deposition of the separation layer 44, the surface of the assembly formed to this point is cleaned to assure suitable bonding.

The insulator layer 44 is deposited over the Permalloy pole piece layer 38R to a level L, which follows the contours of the layer 38R. The insulator 44 is lapped to a smooth planar surface S, onto which a second transducing assembly useful for writing data is deposited. The thickness of the insulator layer 44 may be in the order of 40-60 μm to provide an effective separation between the read transducer element and the write transducer element.

A thick insulator separation layer 44 of sputtered Al$_2$O$_3$ is sputter deposited over the read transducer which has just been completed. R.F. sputter etching is utilized for about 5-10 minutes at 1-1.5 Watts per cm$^2$ to obtain a clean predeposition surface. The temperature of the substrate must be kept below 100° C. during the sputter deposition of the Al$_2$O$_3$.

After the thick insulator layer 44 has been formed over the read transducer, the layer is lapped flat to expose the relatively thick contact studs 28 and to provide adequate flatness for the subsequent depositions. The write transducer element is then fabricated, following the same processes and using the same materials as utilized for the read element. Alignment marks in the layers comprising the read element are used also in the fabrication of the write elements, since the separator layer is transparent, thus permitting registration of the read and write elements to within photolithographic limits. However, the thicknesses of the Permalloy layers 32W and 38W and of the write transducing gap 34W are each larger than those for the read element by about 1 μm. An overcoat insulating layer 32 of Al$_2$O$_3$ of about 25 to 50 μm thickness is then formed as a protective layer over the exposed Permalloy pole piece layer 38W. Contact studs 30 are exposed by lapping.

Once the read and write transducer assemblies have been completed, the slider substrate is cut and shaped to provide an air bearing taper-flat surface 26 for interaction with the recording surface of a magnetic medium, such as a magnetic disk. The slider configuration may be of the type disclosed in U.S. Pat. No. 3,855,625, issued to M. Garnier et al.

As a result of the configuraton disclosed, the problems of adhesion, tensile stress, and protective coverage of the layered structures are minimized. The use of transparent amorphous Al$_2$O$_3$ adjacent to the read transducer allows alignment and registration of the write and read transducer layers and control of the relative dimensions of the transducing gaps and magnetic circuits. The process of making the combined read and write transducer assembly lends itself to batch fabrication, and temperature control for both read and write elements.

What is claimed is:

1. A thin film head structure comprising:
   a nonmagnetic substrate;
   a read transducer formed from a plurality of thin film layers, including a read transducing gap layer, formed on one surface of said substrate;
   a thick transparent insulator layer formed on said read transducer;
   a write transducer formed from a plurality of thin film layers, including a write transducing gap layer, formed on said thick insulating layer; and
   a protective insulating overcoat layer formed on said write transducer.

2. A thin film head structure as in claim 1, wherein said substrate is formed as an air bearing head slider having an air bearing surface for flying in transducing relation relative to a record medium.

3. A thin film head structure as in claim 2, wherein said air bearing surface has a taper-flat configuration.

4. A thin film head structure as in claim 2, wherein said transducing gap layers have effective gap portions disposed at said air bearing surface.

5. A thin film head structure as in claim 1, wherein said thick insulator layer is formed by sputtering Al$_2$O$_3$.

6. A thin film head structure as in claim 1, wherein said thick insulator layer is at least twice the thickness of the film structure making up the read transducer.

7. A thin film head structure as in claim 1, wherein said thick insulator layer has a thickness in the range of 25-50 μm.

8. A thin film head structure as in claim 1, wherein the thickness of said write transducing gap is approximately twice that of said read transducing gap.

9. A thin film head structure as in claim 1, wherein said read and write transducers each comprise a pair of Permalloy pole pieces around a respective gap layer for forming a magnetic circuit.

10. A thin film head structure as in claim 1, wherein said gap layers are formed by sputter deposition of Al$_2$O$_3$ 0.5 to 2 μm thick.

11. A thin film head structure as in claim 1, wherein electrical insulating layers comprise baked photoresist.

12. A method for manufacturing a thin film head structure, comprising the steps of:
   polishing the surface of a substrate;
   plating a first layer of Permalloy on said substrate;
   depositing an aluminum oxide layer on said Permalloy to form a nonmagnetic transducing gap;
   removing a portion of said aluminum oxide layer in the back gap area of the structure;
   covering the Permalloy with a photoresist and patterning said photoresist layer;

electroplating conductive coils and leads over said photoresist layer;

depositing an insulating layer to provide a leveling pad;

plating a second Permalloy layer onto said pad, so that the back gap closure is formed;

plating electrical contacts to connect to said conductive leads and coils;

sputter depositing a thick transparent insulator layer over said contacts;

lapping said thick insulator layer to a specified flatness;

repeating all of said steps except for sputter depositing and lapping said thick transparent insulator layer; and forming a protective layer over the last deposited Permalloy layer.

* * * * *